United States Patent
Hinz et al.

(10) Patent No.: US 6,713,599 B1
(45) Date of Patent: Mar. 30, 2004

(54) FORMATION OF POLYMER POLYOLS WITH A NARROW POLYDISPERSITY USING DOUBLE METAL CYANIDE (DMC) CATALYSTS

(75) Inventors: Werner Hinz, Grosse Ile, MI (US); Jacob Wildeson, Chambersburg, PA (US); Edward Michael Dexheimer, Grosse Ile, MI (US); Raymond Neff, Northville, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/403,197

(22) Filed: Mar. 31, 2003

(51) Int. Cl.⁷ ............................................. C08G 65/10
(52) U.S. Cl. ..................... 528/408; 528/403; 528/412; 528/414; 528/428; 568/672; 568/678; 568/679; 568/680
(58) Field of Search .................. 528/403, 408, 528/412, 414, 421; 568/672, 678, 679, 680

(56) References Cited

U.S. PATENT DOCUMENTS

| | | | |
|---|---|---|---|
| 4,472,560 A | 9/1984 | Kuyper et al. | 526/120 |
| 4,500,704 A | 2/1985 | Kruper, et al. | 528/405 |
| 4,826,887 A | 5/1989 | Kuyper et al. | 521/189 |
| 4,826,952 A | 5/1989 | Kuyper et al. | 528/405 |
| 4,826,953 A | 5/1989 | Kuyper et al. | 528/405 |
| 5,158,922 A * | 10/1992 | Hinney et al. | 502/175 |
| 5,482,908 A | 1/1996 | Le-Khac | 502/156 |
| 5,525,565 A | 6/1996 | Le-Khac | 502/159 |
| 5,714,428 A | 2/1998 | Le-Khac | 502/159 |
| 5,958,994 A | 9/1999 | Lear et al. | 521/174 |
| 6,013,731 A | 1/2000 | Holeschovsky et al. | 525/123 |
| 6,083,420 A | 7/2000 | Lear et al. | 252/812.24 |
| 6,204,357 B1 | 3/2001 | Ooms et al. | 528/409 |
| 6,410,676 B1 | 6/2002 | Yamasaki et al. | 528/76 |
| 6,429,342 B1 | 8/2002 | Clement et al. | 568/616 |
| 2003/0032761 A1 | 2/2003 | Hofmann et al. | 528/198 |

FOREIGN PATENT DOCUMENTS

| WO | WO 9729146 | 2/1997 |
|---|---|---|
| WO | WO 9852689 | 4/1998 |

* cited by examiner

*Primary Examiner*—Robert Dawson
*Assistant Examiner*—D. Aylward
(74) *Attorney, Agent, or Firm*—Fernando A. Borrego

(57) ABSTRACT

A method of forming a polyol includes the steps of reacting an initiator with an alkylene oxide, and optionally carbon dioxide, in the presence of a double metal cyanide catalyst and a sterically hindered chain transfer agent capable of protonating the growing polyol polymer. The presence of the chain transfer agent reduces the polydispersity of the resultant polyol.

25 Claims, No Drawings

FORMATION OF POLYMER POLYOLS WITH A NARROW POLYDISPERSITY USING DOUBLE METAL CYANIDE (DMC) CATALYSTS

FIELD OF THE INVENTION

The present invention relates to an improved method of forming polymer polyols. More specifically, the present invention relates to an improved method of forming polymer polyols having a narrow molecular weight distribution using double metal cyanide (DMC) catalysts.

BACKGROUND OF THE INVENTION

Polymer polyols are used in large quantities for producing polyurethanes. Several types of polyols, mainly polyether polyols and polyester polyols, but also including polyether carbonate polyols are commonly used in combination with isocyanates, catalysts and other components to form polyurethane polymers. The quality and properties of the polyurethane polymers are directly related to the properties of the polyol being reacted with the isocyanate.

Higher molecular weight polyols are preferably used for the formation of certain polyurethanes such as flexible polyurethane foam and CASE applications. Higher molecular weight polyether polyols are obtained from the reaction of polyol initiators with alkylene oxide monomers in the presence of catalysts. Polyethercarbonate polyols are obtained from the copolymerization reaction of polyol initiators with alkylene oxide monomers and carbon dioxide monomer in the presence of catalysts. One preferred class of catalysts for the formation of polyether polyols and in particular for the formation of polyethercarbonate polyols are double metal cyanide (DMC) catalysts. One problem associated with the formation of polyether polyols using DMC catalysts, is the need to use extremely high purity and high cost DMC catalysts in extremely low catalyst concentrations. High purity DMC catalysts are very expensive and are a significant contribution to manufacturing costs. The extremely low concentrations employed in turn lead to problems with catalyst deactivation and catalyst poisoning during the course of the production process. Another problem associated with the formation of polyether polyols using DMC catalysts, even high quality DMC catalysts, is the formation of unwanted high molecular weight tails, which are small amounts of high molecular weight polyether polymer that severely affect polyurethane foaming and polyurethane foam properties. When polyethercarbonate polyols are produced from the copolymerization reaction of polyol initiators with alkylene oxide monomers and carbon dioxide monomer in the presence of DMC catalysts, the resulting polyethercarbonate polyols typically have a much broader polydispersity than corresponding polyether polyols of comparable molecular weight. Generally polymer polyols with narrow polydispersity are preferred, since broader polydispersity leads to increased polyol viscosity and inferior polyurethane foaming and foam properties.

Several attempts to reduce the high molecular weight tail in polyether polyols have been disclosed. U.S. Pat. Nos. 5,958,944 and 6,083,420 discloses providing an oxyalykyl mixture having essentially pure, higher alkylene oxide during the terminal portion of the polymer formation to limit the growth of the polymer tail. Although the pure, higher alkylene oxide forms no more than about 15 weight percent of the total polyol weight, the desired polyol has been modified to reduce the molecular weight of the polyol tail.

U.S. Pat. No. 6,204,357 discloses a method of preparing polyether polyols where only a small amount of the yield includes a higher molecular weight than desired. The polyether is formed from ethylene oxide that is reacted with primary and secondary initiators in the presence of a double metal cyanide catalyst. The combination of the primary and secondary initiators reduces the amount of high molecular weight tails.

PCT patent publication WO 97/29146 discloses a complex production process involving the continuous addition of starter to achieve reduced levels of high molecular weight tail.

To produce high quality polyurethane foams, it would be desirable to produce a wide range of polyols having a high molecular weight, a narrow polydispersity and a low viscosity while not modifying the characteristics of the polyol.

SUMMARY OF THE INVENTION

In one embodiment, the present invention is a method for forming polyether polyols or polyethercarbonate polyols comprising the steps of: reacting an alkylene oxide or an alkylene oxide and carbon dioxide with an initiator in the presence of a double metal cyanide catalyst, and a sterically hindered chain transfer agent capable of protonating the polyol. The chain transfer agent functions to protonate the end group of the resident growing polymer polyol chain, causing it to leave the DMC catalytic centers so another round of alkylene oxide or carbon dioxide addition can take place with another growing chain.

The use of a chain transfer agent eliminates the need to modify the polyol to reduce the chain tail while still providing the ability to produce a wide range of polyols useful in forming urethanes. The inventive method of forming the polyol increases the chain transfer rate of the reaction to more than the chain growth rate. By balancing these rates in a desirable ratio, the molecular weight distribution of the polyol is optimized without having to modify the polyol.

DETAILED DESCRIPTION OF PREFERRED EMBODIMENTS

Polymers of alkylene oxides are well known and useful in a number of applications, including detergent and cleaner compositions, oil well drilling fluids, inks, metal working fluids, lubricants in paper coating compositions, ceramics manufacturing, chemical intermediates for organic nonionic surfactants which in turn are used in cosmetics, textiles and chemical processing, polyurethanes which are used as flexible foams and elastomers, chemical intermediates for esters which are used in textile spin finishes, manufacturing cosmetic agents, and foam control agents for a wide variety of processes.

In the present invention, a unique method of forming a polyether or polyether carbonate polyol is provided. Such polyols, in one context, are reactive with an isocyanate compound to form a polyurethane. Polyurethanes are typically formed from a polyol and an isocyanate. Various polyols result in polyurethanes having various types of properties that may be desirable for a particular function. One polyol may be reactive with an isocyanate to form a thermoplastic polyurethane and another polyol may be reactive to form a flexible foam. Polyols such as polyether polyols, polyether carbonate polyols, and polypropylene carbonate polyols are reactive with an isocyanate to produce polyurethanes known to have different properties.

Polyols are formed by the polymerization of alkylene oxides and initiators. Double metal cyanide (DMC) catalysts are highly active and produce polyether polyols containing only a very low concentration of by-products (unsaturation). When the polymerization reaction is carried out in the presence of $CO_2$ polyether carbonate polyols are formed.

Double metal cyanide catalysts are used to increase and control the rate of formation of the polyol polymer chain during the formation of a polyol. Double metal cyanide catalysts known to be effective are: zinc hexacyanoferrate (EH), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyano cobaltate (III), zinc hexacyano cobaltate (II), zinc hexacyanomanganate (II), zinc hexacyano chromate (III), zinc iodo pentacyanoferrate (III), cobalt (II) chloropentacyanoferrate (II), cobalt (II) bromopentacyanoferrate (II), iron (II) fluoropentacyanoferrate (II), zinc chlorobromotetracyanoferrate (III), iron (III) hexacyanoferrate (III), aluminum dichlorotetracyanoferrate (III), molybdenum (IV) bromopentacyanoferrate (II), molybdenum (VI) chloropentacyanoferrate (II), vanadium (IV) hexacyanochromate (II), vanadium (V) hexacyanoferrate (III), strontium (II) hexacyanomanganate (III), tungsten (IV) hexacyano vanadate (IV), aluminum chloropentacyano vanadate (V), tungsten (VI) hexacyanoferrate (III), manganese (II) hexacyanoferrate (II), chromium (III) hexacyanoferrate (III), and so forth. Still Other cyanide complexes can also be used such as $Zn[Fe(CN)_5NO]$, $Zn_3[Fe(CN)_5NO_2]_2$, $Zn[Fe(CN)_5CO]$, $Zn[Fe(CN)_5H_2O]$, $Fe[Fe(CN)_5OH]$, $Cr[Fe(CN)_5NCO]$, $Cr[Fe(CN)_5NCS]$, $Al[Co(CN)_5CNO]$, $Ni_3[Mn(CN)_5CNS]_2$, and the like. Mixtures of these compounds can be employed. Each of these double metal cyanide catalysts are disclosed in U.S. Pat. Nos. 4,472,560; 4,500,704; 4,826,887; 4,826,952; and 4,826,953, the disclosures of which are incorporated herein by reference.

The initiator compound contains one or more oxyalkylatable groups such as hydroxyl, thiol, carboxylic acid and the like. The initiator compound determines the functionality (i.e., number of hydroxyl groups/molecule of product) and in some cases may introduce some desired functional group into the product. Suitable initiator compounds include, for example, alkanols such as butanol, diols, such as butane diol, glycols such as dipropylene glycol, glycol monoalkyl ethers, aromatic hydroxy compounds, glycerine, trimethylol propane, and pentaerythritol. Preferably the initiator should be in the form of an oligomer and include one or more alkylene oxide groups for the DMC catalyst to function efficiently.

Alkylene oxides are provided to the reaction in order to form the polyol polymer. For example, ethylene oxide, butylene oxide, and/or propylene oxide are used to produce polyetherol polyols. When combining alkylene oxides with carbon dioxide, polyether carbonate polyols are formed.

In the present invention, it has been found that sterically hindered chain transfer agents added to the polymerization reaction can improve the polyol by reducing the polydispersity of the resulting polymer polyol as well as its viscosity, both of which are important factors in the production of high quality polyurethane products. Several chain transfer agents have proven effective in providing these desirable properties to the polyol. For example, hindered alcohols such as t-butanol, hindered phenols such as di-t-butylphenol, and hindered benzoic acids such as di-t-butylbenzoic acid have all provided improved urethane properties when introduced into the polyol reaction. In addition, sterically hindered thiols are also effective chain transfer agents in the present invention. Some examples include: thiophenol, 2-mercaptoethanol, mercaptopropanol, 2-propyl-mercaptan, thioglycerol, and cyclobutyl mercaptan.

Not intending to be bound by theory, it is believed that during a normal polymerization reaction leading to polymer polyols of narrow polydispersity, the growing chain needs to leave the DMC catalyst surface after every addition of an alkylene oxide monomer unit. The DMC catalyst has active reaction sites that include a metal, such as, for example, Zn. Growing chains return to the reaction site for the next monomer addition. The problems set forth above occur when the growing chain does not leave the reaction site and stays attached to the DMC catalyst continuing to grow to unwanted higher molecular weights. The chain transfer agent induces the growing chain to leave the catalytic site by protonating the end group of the growing polymer polyol chain. The chain transfer agent in turn is then readily displaced from the DMC compound by another growing polymer chain.

The useful chain transfer agents are sterically hindered compounds. This will restrict their reaction with the carbon dioxide or the alkylene oxide monomer, becoming an initiator for a growing polymer chain themselves and thus not being available any more to act as chain transfer agents. The sterically hindered chain transfer agent can be added to the reaction at the beginning of the alkylene oxide addition, or during the polymerization. A less-sterically hindered chain transfer agent should be added slowly during the addition of the alkylene oxide to replace any portion of the chain transfer agent which may have reacted with alkylene oxide monomer itself and thus to maintain a constant concentration of chain transfer agent in the reaction mixture.

The chain transfer agent has a pKa value that enables the chain transfer agent to protonate the growing polymer polyol chains to displace the chain from the double metal cyanide catalyst surface. In order to effectively protonate the polyol chain ends, the chain transfer agent must be present at a desirable molar concentration. A molar concentration of the chain transfer agent that is ten times the molar concentration of the double metal cyanide catalyst is preferred. More preferred, the molar concentration of the chain transfer agent is about 50 times the molar concentration of the double metal cyanide catalyst. Still more preferred, is a molar concentration of the chain transfer agent of greater than about 100 times the molar concentration of the double metal cyanide catalyst.

The inventive method of forming the polyol increases the chain transfer rate of the reaction to make it competitive with the chain growth rate. By balancing these rates in a desirable ratio, the molecular weight distribution of the polyol is optimized without having to modify the polyol or without having to use complex production processes. This is particularly beneficial in the case of polyether polyol formation. The use of extremely high purity, high cost DMC catalysts to ensure the formation of low polydispersity polyether polyols is now no longer necessary. Standard, lower cost DMC catalysts can now be used and manufacturing costs can be reduced. In addition, these standard, lower cost DMC catalysts can be used at higher concentrations, eliminating the risk of DMC catalyst deactivation by the presence of DMC catalyst poisons in the reaction mixture even in minute quantities. Furthermore, the formation of unwanted high molecular weight tails, even when extremely high quality, high purity DMC catalysts are used, can be reduced. This is also particularly beneficial in the case of polyethercarbonate polyol formation. The polydispersity of polyethercarbonate polyols produced by the copolymerization reaction of alkylene oxide monomers and carbon dioxide monomer in the presence of DMC catalysts is always significantly broader than the polydispersity of corresponding polyether polyols of comparable molecular weight and functionality. Using chain transfer agents, the polydispersity of polyethercarbonate polyols useful for the production of polyurethane polymers can be reduced and polyethercarbonate polyols of low viscosity and with good applications properties are obtained.

The chain transfer agent is preferably selected from t-butanol, substituted t-butanols, tertiary aliphatic alcohols, di-t-butylphenol, substituted di-t-butylphenols, sterically hindered polysubstituted phenols, di-t-butylbenzoic acid and substituted di-t-butylbenzoic acids. Mixtures of these chain transfer agents can also be used. A chain transfer agent that is very sterically hindered can be added to the polymerization reaction when desired. A chain transfer agent that is less sterically hindered is preferably metered into the polyol reaction. It has been found that the sterically hindered compounds useful as chain transfer agents, such as t-butanol, must be present in the reaction mixtures and they must be present in the reaction mixture in significant molar excess relative to the amount of DMC catalyst present. Compounds such as t-butanol, have been incorporated in small molar quantities in DMC catalysts as complexing agents during the production of the DMC catalyst itself, but as complexing agents and complex ligands they are not available in the reaction mixture to act as chain transfer agents during the course of the production process. Their presence in the DMC catalysts does not significantly increase the chain transfer rate during the reaction and thus does not reduce the polydispersity of the resulting polymer polyol. U.S. Pat. No. 5,158,922 discloses the composition of DMC catalysts containing 0.5–10 moles of complexing agent.

EXAMPLES

Several types of polyols are prepared using chain transfer agents in order to evaluate quality of the resultant polyol. A clean dry 300 ml autoclave, equipped with an agitator and an external heating unit along with an internal cooling coil is used. The autoclave also includes an alkylene oxide feed line, a gas feed line, a pressure and temperature sensor. The autoclave is charged with 70 grams of purified initiator polyol (adduct of glycerine and a propylene oxide monomer having a molecular weight of 1430, a water content of less than 0.3%, a residual catalyst content of less than 5 ppm) and the double metal cyanide catalyst. The initiator-catalyst mixture is heated to 130° C. under vacuum (less than 1 milliliter Hg) for two hours to remove any residual moisture. The vacuum system is disconnected and the reactor pressurized to 0 psi using argon gas. Five grams of propylene oxide is added, the pressure increased and the reactor is monitored. Within 15 to 30 minutes, the reactor pressure declines to 0 psi, indicating that the double metal cyanide catalyst is active. 170 g of propylene oxide monomer is then added at 110° C. at a constant rate of 1 g/min. Following the completion of the propylene oxide addition step, unreacted monomer is left to react out at 110° C. The reactor is then vented and cooled and the product collected.

Polyether Polyol Example 1

The peak molecular weight and the weight average molecular weight were determined by gel permeation chromatography. The described chain transfer agent can either be added to the initiator or slowly during the course of the propylene oxide addition. Following the 300 milliliter autoclave procedure described above, 0.5 grams of a suspension of the double metal cyanide catalyst (5% in a purified initiator polyol, an adduct of the glycerine, and propylene oxide monomer, MW 730 equaling 0.025 grams catalyst, corresponding to 0.026 mmole of catalytic zinc centered on the double metal cyanide catalyst) were used with a reaction temperature of 110° C. Tertiary butanol (0.44 grams=6 mmoles) is mixed with the propylene oxide monomer and slowly added to the reaction mixture during the course of the propylene oxide addition period. The yield of the reaction product obtained is 238 g. The peak molecular weight is 2821. The weight average molecular weight is 7386. The polydispersity (Mw/Mn) is 2.08.

A comparative example producing polyether polyols in the absence of chain transfer agents conducted using the same double metal cyanide catalyst showed unfavorable results. The result is a broad, flat, high molecular weight tail, which extended to a very high molecular weight. This tail is significantly greater than the tail produced using the tertiary butanol chain transfer agent detailed above.

Polyether Polyol Comparative Example 2

Following the 300 milliliter autoclave procedure, 0.5 g of a suspension of a double-metal cyanide catalyst (5% in a purified initiator polyol, an adduct of glycerine and propylene oxide monomer, MW 730=0.025 g catalyst, corresponding to 0.026 mmole of catalytic Zn centered on the double metal cyanide catalyst) were used and the reaction temperature is 110° C. Propylene oxide is added to the reactor. The yield of the reaction product obtained is 235 g. Its peak molecular weight is 2579, weight average molecular weight is 16707. The polydispersity (Mw/Mn) is 4.20.

The general procedure for the synthesis of polyethercarbonate polyols using the double metal cyanide catalyst in the 300 milliliter autoclave will now be described:

A clean, dry, 300 ml autoclave is equipped with an agitator, an external heating device, an internal cooling coil, a propylene oxide feed line, a gas feed line, and temperature and pressure sensors. The autoclave is charged with 70 g of purified initiator polyol (adduct of glycerine) and propylene oxide monomer (Mw 730, water content less than 0.03%, residual catalyst content less than 5 ppm) and a double metal cyanide catalyst.

The initiator-catalyst mixture is heated to 130° C. under vacuum (less than 1 mm Hg) for two hours to remove any residual moisture. The vacuum system is disconnected and the reactor pressurized to 0 psi using argon gas. Five grams of propylene oxide is added and the pressure increase in the reactor is monitored. Within 15–30 minutes, the reactor pressure declined back to 0 psi indicating that the double metal cyanide catalyst is active. 170 g propylene oxide monomer is then added at 130° C. at a constant rate of 1 g/min. Five minutes after commencement of the propylene oxide feed, the reactor is pressurized with $CO_2$ gas for the duration of the propylene oxide feed. Following the completion of the propylene oxide addition step, unreacted monomer is left to react out at 130° C. The reactor is then vented and cooled and the product collected. The peak molecular weight and the weight average molecular weight were determined by gel permeation chromatography. The viscosity is measured using a Brookfield DV-III rheometer. The carbonate content of the polymer is determined by IR (peak at 1745 cm$^{-1}$) and calculated as weight percent $CO_3$ in the polymer. The propylene carbonate formed as a byproduct is not removed. In the example detailed below, the described chain transfer agent can either be added to the initiator or slowly during the course of the propylene oxide addition.

Polyether Carbonate Polyol Example 1

Following the 300 ml autoclave procedure described above, 0.5 g of a suspension of the double metal cyanide catalyst, 5% in a purified initiator polyol, an adduct of glycerine and propylene oxide monomer, MW 730=0.025 g catalyst corresponding to 0.026 mmole of catalytic Zn centered on the double metal cyanide catalyst were used. The reaction temperature is 110° C. and the reactor is pressurized with $CO_2$ to 860 psi. t-Butanol (0.44 g=6 mmoles) is mixed with the propylene oxide monomer and slowly added to the reaction during the course of the propylene oxide addition period. The yield of the reaction product obtained is 286 g. Its peak molecular weight is 1923. Its average molecular weight is 2919. The polydispersity (Mw/Mn) is 1.31. The carbonate content of the polyether carbonate polyol is 12.8%.

Polyether Carbonate Polyol Example 2

Following the 300 ml autoclave procedure, 0.5 g of a suspension of the double metal cyanide catalyst, 5% in a purified initiator polyol, an adduct of glycerine and propylene oxide monomer, MW 730=0.025 g catalyst, corresponding to 0.026 mmole of catalytic zinc centered on the double metal cyanide catalyst were used. The reaction temperature is 110° C. and the reactor is pressurized with $CO_2$ to 880 psi. Tertiary butanol (0.44 g=6 mmoles) is mixed with the initiator after double metal cyanide catalyst activation. The yield of the reaction product obtained is 285 g. Its peak molecular weight is 1745. Its weight average molecular weight is 2977. The polydispersity (Mw/Mn) is 1.36. The carbonate content of the polyether carbonate polyol is not recorded.

Polyether Carbonate Polyol Example 3

Following the 300 ml autoclave procedure, 0.5 g of a suspension of the double metal cyanide catalyst, 5% in a purified initiator polyol, an adduct of glycerine and propylene oxide monomer, MW 730=0.025 g catalyst, corresponding to 0.026 mmole of catalytic zinc centered on the double metal cyanide catalyst were used. The reaction temperature is 110° C. and the reactor is pressurized with $CO_2$ to 860 psi. 2,4,6-tri-t-butylphenol (1.5 g=6 mmoles) is mixed with the propylene oxide monomer and slowly added to the reaction mixture during the course of the propylene oxide addition period. The yield of the reaction product obtained is 286 g. The peak molecular weight is 1824. The weight average molecular weight is 3159. The polydispersity (Mw/Mn) is 1.41. The carbonate content of the polyether carbonate polyol is 13.1%.

Polyether Carbonate Polyol Example 4

Following the 300 ml autoclave procedure, 0.5 g of a suspension of the double metal cyanide catalyst, 5% in a purified initiator polyol, an adduct of glycerine and propylene oxide monomer, MW 730=0.025 g catalyst, corresponding to 0.026 mmole of catalytic Zn centered on the double metal cyanide catalyst were used. The reaction temperature is 110° C. and the reactor is pressurized with $CO_2$ to 860 psi. Phenol (0.5 g=6 mmoles) is mixed with the propylene oxide monomer and slowly added to the reaction mixture during the course of the propylene oxide addition. The yield of the reaction product obtained is 283 g. The molecular weight is 1727. Its weight average molecular weight is 2852. The polydispersity (Mw/Mn) is 1.39. The carbonate content of the polyether carbonate polyol is not recorded.

Polyether Carbonate Polyol Example 5

Following the 300 ml autoclave procedure, 0.5 g of a suspension of the double metal cyanide catalyst, 5% in a purified initiator polyol, an adduct of glycerine and propylene oxide monomer, MW 730=0.025 g catalyst, corresponding to 0.026 mmole of catalytic Zn centered on the double metal cyanide catalyst were used. The reaction temperature is 110° C. and the reactor is pressurized with $CO_2$ to 860 psi. Catechol (0.66 g=6 mmoles) is mixed with the propylene oxide monomer and slowly added to the reaction mixture during the course of the propylene oxide addition period. The yield of the reaction product obtained is 287 g. The peak molecular weight is 1644. The weight average molecular weight is 3095. The polydispersity (Mw/Mn) is 1.47. The carbonate content of the polyether carbonate polyol is not recorded.

Polyether Carbonate Polyol Example 6

Following the 300 ml autoclave procedure, 0.5 g of a suspension of the double metal cyanide catalyst, 5% in a purified initiator polyol, an adduct of glycerine and propylene oxide monomer, MW 730=0.25 g catalyst, corresponding to 0.026 mmole of catalytic Zn centered on the double metal cyanide catalyst were used. The reaction temperature is 110° C. and the reactor is pressurized with $CO_2$ to 860 psi. di-t-butyl benzoic acid (1.0 g=4.3 mmoles) is added to the initiator mixture. The yield of the reaction product obtained is 271 g. The peak molecular weight is 1580. The weight average molecular weight is 2845. The polydispersity Mw/Mn is 1.54. The carbonate content of the polyether carbonate polyol is not recorded.

The comparative examples below show that broader molecular weight distribution occurred without the use of chain transfer agents. Further, broader molecular weight distribution through the use of inappropriate transfer agents, such as dipropylene glycol acted only as an initiator and exhibited no chain transfer agent properties. Catalyst deactivation through the use of inappropriate chain transfer agents such as, for example, water and difluorophenol also occurred.

The following polyether carbonate polyol comparative examples verify the results set forth above.

Polyether Carbonate Polyol Comparative Example 1

Following the 300 ml autoclave procedure, 0.2 g of the double metal cyanide catalyst is used as a solid powder. The reaction temperature is 110° C. and the reactor is pressurized with $CO_2$ to 840 psi. No chain transfer agent is added to the reaction mixture. The yield of the reaction product obtained is 284 g. The peak molecular weight is 1692. The weight average molecular weight is 3652. The polydispersity Mw/Mn is 1.73. The carbonate content of the polyether carbonate polyol is 13.2%.

Polyether Carbonate Polyol Comparative Example 2

Following the 300 ml autoclave procedure, 0.5 g of a suspension of the double metal cyanide catalyst, 5% in a purified initiator polyol, an adduct of glycerine and propylene oxide monomer, MW 730=0.025 g catalyst, corresponding to 0.26 mmole of catalytic Zn centered on the double metal cyanide catalyst were used. The reaction temperature is 110° C. and the reactor is pressurized with $CO_2$ to 860 psi. di-propylene glycol (0.80 g=6 mmoles) is mixed with the propylene oxide monomer and slowly added to the reaction mixture during the course of the propylene oxide addition period. The yield of the reaction product obtained is 265 g. The peak molecular weight is 1561. The weight average molecular weight is 3753. The polydispersity Mw/Mn is 1.99. The carbonate content of the polyether carbonate polyol is 12.3%. In this example, the di-propylene glycol did not remain as a chain transfer agent and reacted as an initiator with the propylene oxide and $CO_2$.

Polyether Carbonate Polyol Comparative Example 3

Following the 300 ml autoclave procedure, 0.5 g of a suspension of the double metal cyanide catalyst, 5% in a purified initiator polyol, an adduct of glycerine and propylene oxide monomer, MW 730=0.025 g catalyst, corresponding to 0.026 mmole of catalytic Zn centered on the double metal cyanide catalyst were used. The reaction temperature is 110° C. and the reactor is pressurized with $CO_2$ to 870 psi. 2,6-Difluorophenol (0.78 g=6 mmoles) is mixed with the propylene oxide monomer and slowly added to the reaction mixture during the course of the propylene oxide addition period. The yield of the reaction product obtained is 85 g. The peak molecular weight is 743. The weight average molecular weight is 863. The polydispersity (Mw/Mn) is 1.12. The carbonate content of the product is not determined. In this comparative example, the difluorophenol deactivated the double metal cyanide catalyst reducing the quality of the resultant product.

Polyether Carbonate Polyol Comparative Example 4

Following the 300 ml autoclave procedure, 0.5 g of a suspension of the double metal cyanide catalyst, 5% in a purified initiator polyol, and adduct of glycerine and propylene oxide monomer, MW 730=0.025 g catalyst, corresponding to 0.026 mmole of catalytic Zn centered on the double metal cyanide catalyst were used. The reaction temperature is 110° C. and the reactor is pressurized with $CO_2$ to 870 psi. Water (0.099 g equal 5.5 mmole) is mixed with the propylene oxide monomer and slowly added to the reaction mixture during the course of the propylene oxide addition period. The yield of the reaction product obtained is 78 g. The peak molecular weight is 721. The weight average molecular weight is 816. The polydispersity Mw/Mn is 1.11. The carbonate content of the product is not determined. In this comparative example, the water deactivated the double metal cyanide catalyst reducing the quality of the resultant product.

Polyether Carbonate Polyol Comparative Example 5

Following the 300 ml autoclave procedure, 50 g of a suspension of the double metal cyanide catalyst, 5% in a purified initiator polyol, an adduct of glycerine and propylene oxide monomer, MW 730=0.025 g catalyst, corresponding to 2.6 mmole of catalytic Zn centered on the double metal cyanide catalyst and only 20 g of the purified initiator polyol (adduct of glycerine and propylene oxide monomer, MW 730, water content less than 0.03%, residual catalyst content less than 5 ppm) were used. 130 g of propylene oxide monomer were added to the initiator mixture. The reaction temperature is 110° C. and the reactor is pressurized with $CO_2$ to 880 psi. The yield of the reaction product obtained is 219 g. The peak molecular weight is 1604. The weight average molecular weight is 4784. The polydispersity Mw/Mn is 2.12. The carbonate content of the polyethylene carbonate polyol is 7.8%.

Polyether Carbonate Polyol Comparative Example 6

Following the 300 ml autoclave procedure, 0.1 g of the double metal cyanide catalyst recited in Comparative Example 2 is used as a solid powder. The reaction temperature is 130° C. and the reactor is pressurized with $CO_2$ to 900 psi. The yield of the reaction product obtained is 267 g. The peak molecular weight is 1281. The weight average molecular weight is 8150. The polydispersity Mw/Mn is 1.59. The carbonate content of the polyethylene carbonate polyol is 9.4%. The tertiary butanol used in the double metal cyanide catalyst preparation is not sufficient, and produced a broad polydispersity despite high reaction temperature of 130° C.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A method of forming a polyol comprising the step of: reacting an initiator with an alkylene oxide in the presence of a double metal cyanide catalyst and a sterically hindered chain transfer agent, wherein said chain transfer agent is capable of protonating the growing polyol polymer.

2. The method as set forth in claim 1 further comprising the step of reacting carbon dioxide with said initiator and said alkylene oxide.

3. The method as set forth in claim 1, further including the step of providing a chain transfer agent being more acidic than said polyol.

4. The method as set forth in claim 1 comprising providing the chain transfer agent at a molar concentration of greater than about 10 times the molar concentration of said double metal cyanide catalyst.

5. The method as set forth in claim 1 comprising providing the chain transfer agent at a molar concentration of greater than about 50 times the molar concentration of said double metal cyanide catalyst.

6. The method as set forth in claim 1 comprising providing the chain transfer agent at a molar concentration of greater than about 100 times the molar concentration of said double metal cyanide catalyst.

7. The method as set forth in claim 1, comprising providing ethylene oxide, propylene oxide, or butylene oxide, or mixtures thereof as said alkylene oxide.

8. The method as set forth in claim 1 comprising adding said chain transfer agent simultaneously with said alkylene oxide.

9. The method as set forth in claim 1 comprising providing said chain transfer agent intermittently during the reaction.

10. The method as set forth in claim 1 comprising providing as said sterically hindered chain transfer agent a sterically hindered alcohol, a sterically hindered phenol, a sterically hindered benzoic acid, a sterically hindered thiol, or mixtures thereof.

11. The method as set forth in claim 10 comprising providing t-butanol, di-t-butylphenol, di-t-butylbenzoic acid, thiophenol, 2-mercaptoethanol, mercaptopropanol, 2-propyl-mercaptan, thioglycerol, cyclobutyl mercaptan or mixtures thereof as said chain transfer agent.

12. A method of forming a polyol comprising the steps of:
reacting an initiator with an alkylene oxide and carbon dioxide in the presence of a double metal cyanide catalyst and a chain transfer agent, wherein said chain transfer agent is capable of protonating the growing polyol polymer.

13. The method as set forth in claim 12, wherein said chain transfer agent is sterically hindered.

14. The method as set forth in claim 12 comprising providing a chain transfer agent is more acidic than said polyol.

15. The method as set forth in claim 12 comprising providing said chain transfer agent at a molar concentration of greater than about 10 times the molar concentration of said double metal cyanide catalyst.

16. The method as set forth in claim 12 comprising providing said chain transfer agent at a molar concentration of greater than about 50 times the molar concentration of said double metal cyanide catalyst.

17. The method as set forth in claim 12 comprising providing said chain transfer agent at a molar concentration of greater than about 100 times the molar concentration of said double metal cyanide catalyst.

18. The method as set forth in claim 12 comprising providing ethylene oxide, propylene oxide, or butylene oxide or mixtures thereof as said alkylene oxide.

19. The method as set forth in claim 12 comprising adding said chain transfer agent simultaneously with said alkylene oxide.

20. The method as set forth in claim 12 comprising providing said chain transfer agent intermittently during the reaction.

21. The method as set forth in claim 12 comprising providing as said chain transfer agent a sterically hindered alcohol, a sterically hindered phenol, a sterically hindered benzoic acid, a sterically hindered thiol, or mixtures thereof.

22. The method as set forth in claim 21 comprising providing t-butanol, di-t-butylphenol, di-t-butylbenzoic acid, thiophenol, 2-mercaptoethanol, mercaptopropanol, 2-propyl-mercaptan, thioglycerol, cyclobutyl mercaptan or mixtures thereof as said chain transfer agent.

23. The method as set forth in claim 12, including the step of providing polyether carbonate polyols having a narrow polydispersity of less than 1.5.

24. The method as set forth in claim 23, wherein said polyether carbonate polyols include a carbonate content of greater than 10 weight % carbonate and a narrow polydispersity of less than 1.5.

25. The method as set forth in claim 23, further including the step of using polyether polyols and polyethercarbonate polyols made in the presence of chain transfer agents as raw materials for polyurethanes.

* * * * *